US 6,975,577 B2

(12) United States Patent
Kato

(10) Patent No.: US 6,975,577 B2
(45) Date of Patent: Dec. 13, 2005

(54) OPTICAL INFORMATION RECORDING MEDIUM

(75) Inventor: Masaki Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 638 days.

(21) Appl. No.: 10/188,946

(22) Filed: Jul. 2, 2002

(65) Prior Publication Data
US 2003/0026195 A1 Feb. 6, 2003

(30) Foreign Application Priority Data
Jul. 2, 2001 (JP) .............................. 2001-201349

(51) Int. Cl.⁷ .............................................. G11B 7/24
(52) U.S. Cl. ................................ 369/275.4; 369/275.3
(58) Field of Search ...................... 369/275.4, 275.3, 369/275.2, 277, 278, 279, 13.55, 13.54, 59.12, 369/116; 720/718; 428/64.4, 64.1; 430/270.13

(56) References Cited

U.S. PATENT DOCUMENTS

| 6,108,295 | A | 8/2000 | Ohno et al. |
| 6,115,352 | A * | 9/2000 | Ohno et al. ............... 369/275.4 |
| 6,487,164 | B1 * | 11/2002 | Endoh et al. ............. 369/275.4 |
| 6,757,232 | B2 * | 6/2004 | Yamada et al. .......... 369/59.12 |
| 6,886,177 | B2 * | 4/2005 | Katoh et al. ................. 720/718 |
| 2002/0004119 | A1 | 1/2002 | Akimori et al. |
| 2002/0021594 | A1 | 2/2002 | Nakamura et al. |
| 2003/0008235 | A1 | 1/2003 | Inoue et al. |
| 2004/0190407 | A1 | 9/2004 | Nobukuni et al. |
| 2004/0246835 | A1 | 12/2004 | Nobukuni et al. |

FOREIGN PATENT DOCUMENTS

| EP | 0847049 A2 | 6/1998 |
| EP | 1030292 A1 | 8/2000 |
| EP | 1056077 A2 | 11/2000 |
| EP | 1124228 A1 | 8/2001 |
| EP | 1158506 A1 | 11/2001 |

* cited by examiner

Primary Examiner—Ali Neyzari
(74) Attorney, Agent, or Firm—Cooper & Dunham LLP

(57) ABSTRACT

A rewritable optical information recording medium includes a transparent substrate on which a groove is formed, and a recording layer on which frequency-modulated address information is recorded by wobbling the groove. The recording layer is provided on the transparent substrate. In the rewritable optical information recording medium, $J(M)/M \leq 0.17$ is satisfied where $J(M)$ is relative jitter with respect to a basic clock $T0$ and $M$ is a degree of modulation of recorded signal. The relative jitter $J(M)$ is given by $J(M) = T\sigma(M)/T0$ when $T\sigma(M)$ is jitter with respect to the degree of modulation $M$. The jitter $T\sigma(M)$ is caused in the demodulated address information which is one modulated according to mark length modulation.

7 Claims, 2 Drawing Sheets

OPTICAL INFORMATION RECORDING MEDIUM

BACKGROUND OF THE INVENTION

1. Field of the Invention

The present invention generally relates to a rewritable optical information recording medium such as a CD-RW, a DVD-RAM, a DVD-RW, a DVD+RW and a PD, and more particularly to an optical information recording medium as typified by a phase change optical disk.

2. Description of the Related Art

Recently, high-speed recording and high-density recording of the optical information recording media have been in progress. Especially, optical disks using a rewritable phase change material for a recording layer have been widely used. As typical examples of such optical disks, there are CD-RW, DVD-RW, DVD+RW and the like.

These optical disks record unique and absolute address information called ATIP (Absolute Time in Pregroove) or ADIP (Address in Pregroove) thereon as a frequency-modulated signal by wobbling a groove provided on the optical disks. However, as faster and more high-density recording is achieved, reading the address information becomes difficult. Further, occurrence of address error increases due to deterioration of the groove and the recording layer caused by repeated recording. Thus, there is a problem in that after some number of repeated recordings the optical disk cannot be rewritten (overwritten) any more.

The address error is caused by the increase of jitter of an address signal. The jitter increases since a signal to be recorded has an influence on the address signal as noise. As far as the inventor of the present invention knows, there has been no prior art that considers a relationship between the degree of modulation and jitter of the address information on which frequency modulation is performed by wobbling the groove.

SUMMARY OF THE INVENTION

It is a general object of the present invention to provide an improved and useful optical information recording medium by which the above-mentioned problems are solved.

A more specific object of the present invention to provide an optical information recording medium that can be repeatedly rewritten at a high speed and a high density, and can optimize the relationship between the degree of modulation that has an influence on reliability of a recording signal and jitter of address information that causes an address error.

In order to achieve the above-mentioned objects, according to one aspect of the present invention, there is provided a rewritable optical information recording medium, including: a transparent substrate on which a groove is formed; and a recording layer on which frequency-modulated address information is recorded by wobbling the groove, the recording layer being provided on the transparent substrate, wherein $J(M)/M \leq 0.17$ is satisfied where $J(M)$ is relative jitter with respect to a basic clock T0 and M is the degree of modulation of recorded signal, the relative jitter $J(M)$ being given by $J(M)=T\sigma(M)/T0$ when $T\sigma(M)$ is jitter with respect to the degree of modulation M, the jitter $T\sigma(M)$ being caused in the demodulated address information which is one modulated according to mark length modulation.

According to the above-mentioned aspect of the present invention, the ratio between the jitter $J(M)$ of the address information and the degree of modulation M is low. In other words, the jitter $J(M)$ of the address information is low while securing a recording signal having high amplitude. Thus, it is possible to provide an optical information recording medium that can be rewritten many times and can prevent an address error.

Additionally, according to another aspect of the present invention, the above-mentioned optical information recording medium may further satisfy a condition $J(M)/M \geq 0.12$.

According to the above-mentioned aspect of the present invention, the ratio between the jitter $J(M)$ and the degree of modulation M is set within an optimum range. Therefore, it is possible to control the jitter of recording information addresses to be low even when overwriting is performed many times.

Additionally, according to another aspect of the present invention, the above-mentioned optical information recording medium may be structured by successively stacking a lower dielectric protective layer, the recording layer, an upper dielectric protective layer and a reflective layer on the transparent substrate.

According to the above-mentioned aspect of the present invention, the optical information recording medium has a simple structure. Thus, it is possible to provide an optical information recording medium with high reliability and less defects.

Additionally, according to another aspect of the present invention, the recording layer may include an AgInSbTe alloy as a main component, and when a composition of the alloy is represented by $Ag\alpha In\beta Sb\gamma Te\delta$ ($\alpha$, $\beta$, $\gamma$, $\delta$ denote atomic percentages, respectively), $\alpha$, $\beta$, $\gamma$ and $\delta$ fall within the following ranges:

$0.1 \leq \alpha \leq 7.0$, $2.0 \leq \beta \leq 10.0$, $64.0 \leq \gamma \leq 92.0$, $5.0 \leq \delta \leq 26.0$, and $\alpha+\beta+\gamma+\delta \geq 97$.

According to the above-mentioned aspect of the present invention, the composition of the alloy forming the recording layer is optimized. Thus, it is possible to secure a good recording signal property even when the optical information recording medium is recorded at a linear velocity equal to or faster than 7 m/s.

Additionally, according to another aspect of the present invention, the above-mentioned optical information recording medium may satisfy a condition $J(M) \leq 0.1$.

Accordingly, since the jitter $J(M)$ is optimized, it is possible for the optical information recording medium to prevent address error.

Additionally, according to another aspect of the present invention, the above-mentioned optical information recording medium may satisfy a condition $M \geq 0.55$.

According to the above-mentioned aspect of the present invention, optimization is performed on the degree of modulation of a signal of recording information. Therefore, it is possible to obtain a signal with a high S/N (signal-to-noise) ratio.

Additionally, according to another aspect of the present invention, in the above-mentioned optical information recording medium, each of the intervals of the grooves may be no more than 1.2 μm.

According to the above-mentioned aspect of the present invention, since each of the intervals is no more than 1.2 μm, it is possible to record on the optical information recording medium with a higher density than that of a conventional compact disk.

Other objects, features and advantages of the present invention will become more apparent from the following detailed description when read in conjunction with the following drawings.

DETAILED DESCRIPTION OF THE PREFERRED EMBODIMENTS

In the following, a detailed description will be given of an embodiment of the present invention.

First, the structure of an optical information recording medium according to the embodiment will be now explained.

Figure 1:
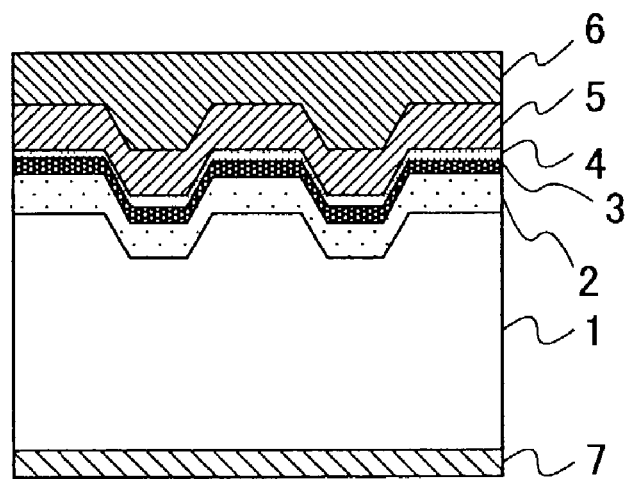
FIG. 1 is a fragment cross-sectional view showing a preferred layer structure of an optical information recording medium according to an embodiment of the present invention.

FIG. 1 is a partial side-elevational sectional view of the optical information recording medium. The optical information recording medium has at least one recording layer on a transparent substrate. More specifically, it is preferable for the optical information recording medium to have the layer structure as shown in FIG. 1.

That is, a lower protective layer 2, a recording layer 3, an upper protective layer 4 and a reflective layer 5 are successively stacked on a transparent substrate 1. Additionally, an over coat layer 6 or a printing layer (not shown) may be provided on the reflective layer 5. Further, a hard coat layer 7 may be provided on the back of the transparent substrate 1.

The transparent substrate 1 must be transparent in a zone of a wavelength of light used for recording on and reproducing from the optical information recording medium.

Next, a description will be given of materials used for the respective layers.

As a material for the transparent substrate 1, glass, ceramics, resin or the like can be used. However, it is preferable to use resin since resin has transparency and is easy to mold.

As such a resin, there are polycarbonate, acrylic resin, epoxy resin, polystyrene, acrylonitrile-styrene copolymer resin, polyethylene, polypropylene, silicone resin, fluorocarbon resin, ABS resin, urethane resin and the like. However, it is preferable to use polycarbonate or acrylic resin since they have good molding properties, optical characteristics, and cost effectiveness.

It is necessary that a wobbled groove be formed on the transparent substrate 1. At the same time, it is also necessary that the groove be wobbled by a carrier frequency f0 with respect to a linear velocity at which the optical information recording medium reproduces recorded information. Additionally, it is further necessary that address information that is digitized within a range of $\pm \Delta f$ with respect to the carrier frequency f0 is frequency-modulated and recorded in the wobble.

As operative examples of the modulation, ATIP (Absolute Time in Pregroove) modulation for CD-Rs and CD-RWs and ADIP (Address in Pregroove) modulation for DVD-RWs can be listed.

For the lower protective layer 2 and the upper protective layer 4, a dielectric material is used in consideration of thermal property and optical properties. As the dielectric material, there are oxides such as $SiO_2$, SiO, ZnO, $SnO_2$, $TiO_2$, $In_2O_3$, MgO, $ZrO_2$, nitrides such as $Si_3N_4$, AlN, TiN, BN, ZrN, sulfides such as ZnS, $In_2S_3$, $TaS_4$, carbides such as SiC, TaC, $B_4C$, WC, TiC, ZrC, and a carbonado (carbon diamond or black diamond). The above-mentioned materials are used independently or by mixing two or more of the materials.

Each of the lower protective layer 2 and the upper protective layer 4 is formed by employing the vacuum deposition method, the sputtering method, the ion plating method, the CVD (Chemical Vapor Deposition) method or the like. However, it is preferable to employ the sputtering method in terms of productivity and cost effectiveness.

It is possible to arbitrarily and differently determine the material and the thickness of each of the lower protective layer 2 and the upper protective layer 4. An optimum value is set for each of the thicknesses of the lower protective layer 2 and the upper protective layer 4, in consideration of respective optical and thermodynamic properties. Generally, the thickness is approximately 10 nm to 5000 nm.

For the recording layer 3, a phase change recording material is used. Generally, as a phase change recording material suitable for the optical information recording medium, an alloy material is used. For example, GeTe, GeTeSe, GeTeS, GeSeSb, GeAsSe, InTe, SeTe, SeAs, GeTe—(Sn, Au, Pd), GeTeSeSb, GeTeSb, AgInSbTe, GeInSbTe, and GeAgInSbTe can be listed. Especially, in the optical information recording medium according to the present invention, it is preferred that an AgInSbTe alloy is used as a main component.

The composition rate of each element is optimized according to a linear velocity used in recording. In order to achieve a high recording property at a recording speed no less than 7 m/s, it is preferable that an alloy is used of which composition is represented by $Ag\alpha In\beta Sb\gamma Te\delta$ ($\alpha$, $\beta$, $\gamma$, $\delta$ denote atomic percentages with respect to the total elements composing the recording layer 3). At the same time, it is also preferable that the above-mentioned $\alpha$, $\beta$, $\gamma$, $\delta$ satisfy the following conditions:

$$0.1 \leq \alpha \leq 7.0$$

$$2.0 \leq \beta \leq 10.0$$

$$64.0 \leq \gamma \leq 92.0$$

$$5.0 \leq \delta \leq 26.0$$

$$\alpha+\beta+\gamma+\delta \geq 97$$

Each composition rate is determined based on the thermodynamic and optical properties. In the present invention, recording is performed by irradiating an optical beam focused by an objective lens in the vicinity of the recording layer 3. It is preferable that the numerical aperture (NA) of the objective lens falls within a range from 0.50 through 0.70, and the wavelength of the optical beam falls within a range from 600 nm through 800 nm. Further, it is preferable that the energy of the optical beam irradiated to the optical information recording medium falls within a range from 10 mW to 40 mW, in consideration of the cost and performance of a recording apparatus.

It is necessary that each composition rate be optimized in consideration of the above-mentioned conditions for optical recording. However, basic characteristics of the recording layer 3 made of an alloy are determined mainly based on the composition rates of Sb and Te ($\gamma$ and $\delta$, respectively). When considering the above-mentioned conditions, it is preferred that the ranges of the compositions ($\gamma$ and $\delta$) of Sb and Te are $64.0 \leq \gamma \leq 92.0$ and $5.0 \leq \delta \leq 26.0$, respectively. In a case where $\gamma$ is below the above-mentioned range, or where $\delta$ is over the above-mentioned range, the recording layer 3 obtains a thermodynamic property with which crystallization is difficult. Accordingly, the recording layer 3 cannot correspond to a high-speed recording. On the other hand, in a case where $\gamma$ is over the above-mentioned range and $\delta$ is below the above-mentioned range, it is very difficult for the recording layer 3 to assume an amorphous state therein. Thus, in this case, it is necessary to irradiate a beam with higher energy focused in the vicinity of the recording layer 3. As a consequence, a large quantity of energy is applied to the optical information recording medium. Therefore, the performance of the optical information recording medium is deteriorated due to its heating history, and thus operating life (capability of bearing rewriting many times thereon) of the optical information recording medium is shortened.

The composition rates of Ag and In have a great influence on the reliability of the optical information recording medium. In order to improve the number of times of continuous reproducing and the stability of amorphous marking under a high temperature environment, it is preferable that the conditions $0.1 \leq \alpha \leq 7.0$ and $2.0 \leq \beta \leq 10.0$ are satisfied.

In addition, as an impurity, an arbitrary element may be mixed in an alloy that satisfies the above-described conditions. As the impurity mixed in such an alloy, B, N, C, O, Si, P, Ga, Ge, S, Se, Al, Ti, Zr, V, Mn, Fe, Co, Ni, Cr, Cu, Zn, Sn, Pd, Pt and Au can be listed.

The recording layer 3 is stacked by employing a vacuum film forming method such as the vacuum deposition method, the sputtering method, the ion plating method, or the CVD method. However, it is preferable to employ the sputtering method in consideration of the productivity and cost effectiveness.

The reflective layer 5 reflects a recording beam and a reproducing beam, and radiates (and conducts) heat that is generated in recording away from the recording layer.

Generally, as a material of the reflective layer 5, metal or alloy is used. For example, an alloy may be used that alloys a metal such as Ag, Au, or Al, or a combination of these metals with at least one of Ti, Si, Cr, Ta, Cu, Pd, C and the like. However, in consideration of the thermodynamic property, the optical characteristic, the productivity and the like, it is preferable to use an alloy including Al as the main component.

It should be noted that the composition of an alloy and the thickness of the alloy can be determined arbitrarily. It is desirable that the composition and the thickness are optimized in terms of the thermodynamic property and optical characteristic.

For the over coat layer 6, a resin material including a photo-setting resin, an electron-beam setting resin or the like as the main component is used. As such a resin, in consideration of the film formation performance and the simplicity of curing, it is preferable to use a resin material including the photo-setting resin as the main component. Generally, an ultraviolet setting resin is used as the photo-setting resin for the material of the over coat layer 6.

As a method for forming a film, there are the dipping method, the spin coat method and the like. Additionally, at least one printing layer may be provided on the over coat layer 6 so as to make a label thereon. Further, the hard coat layer 7 may be provided on the back of the transparent substrate 1 so as to improve the anti-scratch hardness of the optical information recording medium.

For the printing layer, a well-known photo-setting ink may be used. In addition, generally, the film is formed by employing screen printing. The same material and method for forming the film of the over coat layer 6 may be used for the hard coat layer 7.

Further, it is possible to form a reversible optical information recording medium by gluing two optical information recording media together at both over coat layers 6.

Next, a description will be given of a relationship between the degree of modulation and jitter of address information.

In the optical information recording medium according to this embodiment of the present invention, the address information should be provided in the groove formed on the substrate. Since the address information can be represented by a numeric value, the address information can be recorded on the optical information recording medium as binary information (digital). When recording such information on a medium or handling such information as communication information, it is necessary to encode the information. A method for such encoding is generally called modulation. As examples of modulation, there are the mark length modulation (pulse-width modulation, pulse-length modulation, or PAM), the mark position modulation and the like. It is preferable to employ the mark length modulation for achieving high density and in high-speed recording, high-speed reproducing and high-speed transfer.

In the optical information recording medium according to the present invention, it is necessary to employ the mark length modulation (called pulse-width modulation or PWM) that modulates by a length quantized to an integral multiple of a basic clock frequency of a mark (negative pulse) and a land (positive pulse). In such a modulation, it is required to perform modulation according to a constant rule. Generally, rules are provided for arrangement and type on the length of the mark or land (length of a pulse). As examples of such a modulation method, there are the EFM modulation (Eight-to-Fourteen Modulation) and the modulation employed for ATIP of CD-Rs and CD-RWs. In the EFM modulation, 8-bit data are expressed by a 14-bit series, and the mark length or land length is modulated to be three to eleven times as long as that of the clock pulse. In the modulation employed for ATIP of CD-Rs and CD-RWs, 24-bit address data are modulated to a series having a mark length or a land length of one through three times as long as that of the clock pulse.

Thereafter, frequency modulation is further performed on the information modulated as mentioned above.

The technique that performs frequency modulation on an address and records the address thereof to the groove is generally employed for optical disks. For example, ATIP of CD-Rs and CD-RWs, ADIP of DVD-RWs, and the like can be listed.

Generally, the band of modulation frequency of the address information is shifted so as to be differentiated from that of an information recording signal (pit and land). In CD-Rs and CD-RWs, frequency modulation is performed at 22.05 kHz±1 kHz.

Figure 2:
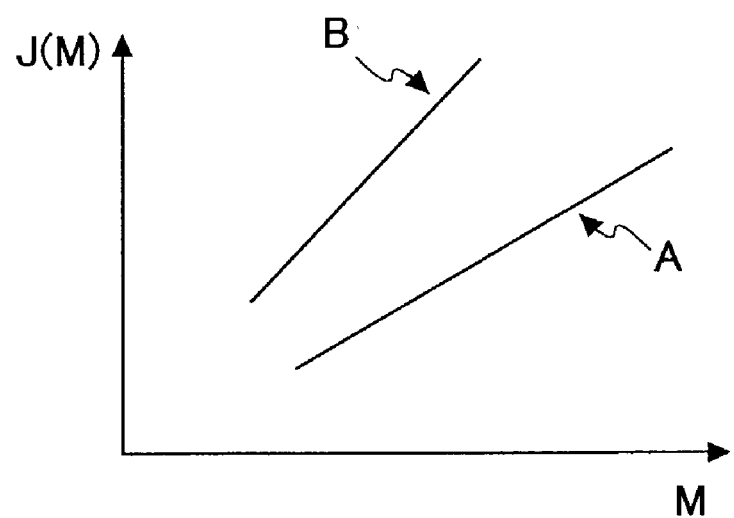
FIG. 2 is a graph showing tendencies of J(M)/M.

FIG. 2 is a graph showing tendencies of J(M)/M where J(M) is the relative jitter with respect to the basic clock T0 of the address information, and M is the degree of modulation. In FIG. 2, the horizontal axis represents M, the vertical axis represents J(M), and two cases A and B (that will be described later) are shown. J(M) is obtained as J(M)=Tσ(M)/T0 where Tσ(M) is the jitter when demodulating and digitizing by a recording/reproducing apparatus the address information that is frequency-modulated and recorded.

As shown in FIG. 2, Tσ(M) has a tendency to increase as the degree of modulation M, that is, the amplitude of a signal of recording information, increases. This is because the amplitude of the recording information corresponding to reflectance fluctuation at high frequency has an influence as a noise component on the address information recorded in the groove. The smaller the degree of modulation M is, the lower the jitter Tσ(M) becomes since the noise component is reduced.

The narrower the distance between the grooves is, the more significant such a tendency becomes, since the influence (cross talk or cross erase) from the adjacent groove increases. However, it is necessary to narrow the distance between the grooves in order to perform high-density recording.

The optimization of the relationship between M and J(M) is required (becomes effective) when the distance between the grooves is no more than 1.6 $\mu$m, and more desirably when the distance is no more than 1.2 $\mu$m.

Additionally, there is a lower limit for the distance between the grooves to perform high-density recording. The lower limit is determined by the size of the beam spot used for recording and reproducing. The size of the beam spot is determined by the numerical aperture (NA) of the optical system, that is, the objective lens, and the wavelength of the light source.

At present, as an optical information recording medium that is examined for practical use, an optical information recording medium in which the distance between the grooves is 0.33 $\mu$m is reported. The above-mentioned medium is recorded and reproduced by an optical system having an objective lens of 0.85 numerical aperture and a light source of 405 nm wavelength.

When the jitter Tσ(M) becomes higher, the recording apparatus cannot read an address on the optical information recording medium. Thus, it is impossible to rewrite on the optical information recording medium any more. Accordingly, the performance of rewriting is deteriorated. On the other hand, when the degree of modulation M becomes lower, S/N (signal-to-noise) ratio of a recording signal is deteriorated. As a result, the reliability of a reproducing signal is significantly deteriorated.

Therefore, it is necessary that the ratio between the jitter Tσ(M) of the address information and the degree of modulation M falls within an optimum range.

In FIG. 2, a line A corresponds to a case where J(M)/M is low. In this case, the degree of modulation M is high and the jitter J(M) is low. Thus, an optical information recording medium corresponding to this case can be regarded as a good medium. However, in such a medium, since the degree of modulation M can be made higher, there is a tendency that the jitter of an RF signal (RF jitter) is deteriorated when rewriting is performed many times.

On the other hand, a line B in FIG. 2 corresponds to a case where J(M)/M is high. In this case, the degree of modulation M is low and the jitter J(M) is high. Accordingly, in order to control the jitter J(M) to be low, it is necessary to control the degree of modulation M to be low. As a result, the S/N ratio of the RF signal is deteriorated. However, by controlling the degree of modulation M to be low, a tendency is developed such that a good RF jitter is obtained even when rewriting is performed many times.

In order to achieve an optimum ratio between the jitter Tσ(M) and the degree of modulation M, it is necessary that the ratio between the standardized address jitter J(M)=Tσ/T0 and the degree of modulation M at least satisfies J(M)/M≦0.17. The value of J(M)/M can be controlled by optimizing the thickness and the material of each of the layers, and how much the groove is wobbled.

However, when rewriting (overwriting) is performed many times, the jitter J(M) tends to increase since thermal damage is accumulated on the recording layer 3 and the groove. Thus, in order to be able to rewrite many times, it is better for modulation M to be low. An optimum degree of modulation M can be defined according to the ratio between the degree of modulation M and the jitter J(M). In other words, it is preferable that J(M)/M≧0.12 is satisfied.

Additionally, referring to the standard value in the Orange Book, it is preferable that the degree of modulation M is no less than 0.55 and the jitter J(M) is no more than 0.1.

Hereinbelow, a detailed description will be given of another embodiment of the present invention so as to explain the present invention more specifically.

First, a phase change optical information recording medium is prepared such that a lower dielectric layer, a recording layer, an upper dielectric layer, a reflective layer and an over coat layer are successively stacked on a disk-type polycarbonate transparent substrate of 1.2 mm thickness on which a spiral continuous groove is transcribed.

To give further detailed description, the distance between the spiral grooves is 1.2 $\mu$m. The groove is wobbled, and address information called ATIP is recorded using the wobbling of the groove according to the standard of rewritable compact disks. The address information is recorded on the wobble of the groove by a 22.05 kHz±1 kHz frequency modulation at 1.0 m/s linear velocity.

The groove is formed with 45 nm depth and 500 nm width. The amplitude of the wobbling is adjusted so that ATIP jitter (that will be described later) falls within a predetermined range. The amplitude (peak-peak) is 40 nm to 120 nm.

As the lower dielectric layer (protective layer), a dielectric material of 100 nm thickness composed of ZnS and 10 wt % $SiO_2$ is stacked on the transparent substrate. For deposition, the RF sputtering method, which is one of vacuum deposition methods, using Ar gas is employed.

Next, the recording layer of 20 nm thickness is formed. The recording layer is made of an alloy including AgInSbTe as the main component. The composition rate of the alloy is set as α=1.0, β=8.0, γ=66, and δ=24. For deposition, the DC magnetron sputtering method is employed.

Next, using the same technique as that used for the lower dielectric layer, the upper dielectric layer (protective layer) is stacked on the recording layer. The upper dielectric layer is made of the same material as that of the lower dielectric layer, and has a 40 nm thickness.

The reflective layer is stacked on the upper dielectric layer using the same technique as that used for the recording layer. The reflective layer is made of an AlTi alloy and has a 150 nm thickness.

Last, the over coat layer is formed such that an ultraviolet setting resin is applied on the reflective layer by employing the spin coat method, and irradiating an ultraviolet light so as to cure the applied resin.

The optical information recording medium made as described above was able to be recorded on, erased, and reproduced from by a commercial CD-RW evaluation apparatus.

In addition, J(M)/M was obtained as follows: the amplitude of the groove was varied so as to make different samples of J(M)/M; and ATIP jitter Tσ(M) and the degree of modulation M were measured after recording only once at a speed eight times as fast as the normal speed (at 8.0 m/s linear velocity) by employing a method described in the Orange Book.

Further, in the same way, the RF jitter was measured when overwriting the optical information recording medium only once, and when overwriting 1000 times.

Figure 3:
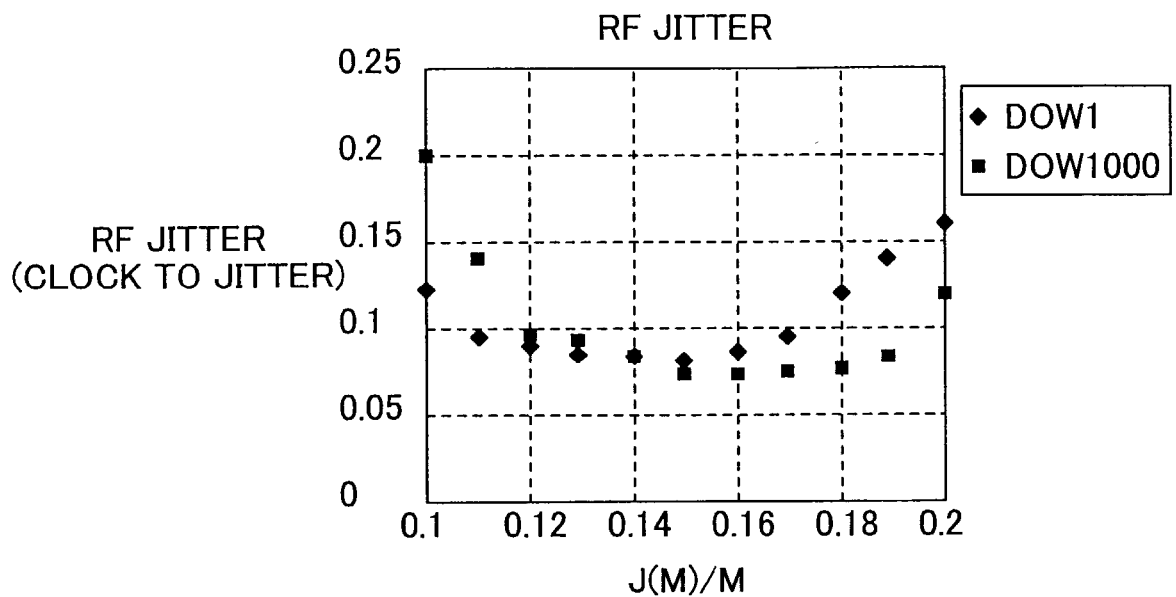
FIG. 3 is a graph showing measured results of RF jitter of an optical information recording medium according to another embodiment of the present invention in cases where a single overwriting is performed and where 1000 times overwriting are performed.

FIG. 3 shows the results of the above-mentioned measurements. As can be seen from FIG. 3, in order to control the RF jitter to be no more than 0.1 in the first overwriting (DOW 1) and in the 1000$^{th}$ overwriting (DOW 1000), it is preferable that J(M)/M falls within a range of:

$$0.12 \leq J(M)/M \leq 0.17.$$

Figure 4:
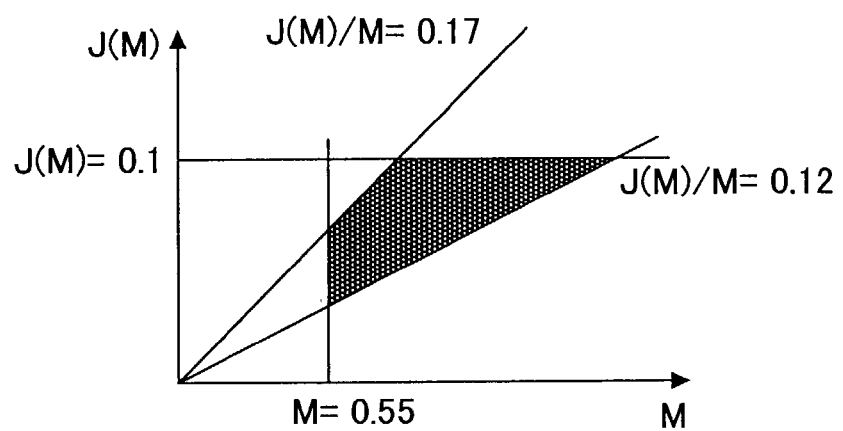
FIG. 4 is a graph showing a range of preferred J(M) and M combinations.

Additionally, as described above, it is preferable that the degree of modulation M is no less than 0.55 and the jitter J(M) is no more than 0.1. Thus, in a good optical information recording medium, the degree of modulation M and the jitter J(M) fall within a shaded part shown in FIG. 4.

The present invention is not limited to the specifically disclosed embodiments, and variations and modifications may be made without departing from the scope of the present invention.

The present application is based on Japanese priority application No. 2001-201349 filed on Jul. 2, 2001, the entire contents of which are hereby incorporated by reference.

What is claimed is:

1. A rewritable optical information recording medium, comprising:
   a transparent substrate on which a groove is formed; and
   a recording layer on which frequency-modulated address information is recorded by wobbling said groove, said recording layer being provided on said transparent substrate,
   wherein J(M)/M≦0.17 is satisfied where J(M) is relative jitter with respect to a basic clock T0 and M is a degree of modulation of recorded signal, said relative jitter J(M) being given by J(M)=Tσ(M)/T0 when Tσ(M) is jitter with respect to said degree of modulation M, said jitter Tσ(M) being caused in the demodulated address information which is one modulated according to mark length modulation.

2. The optical information recording medium as claimed in claim 1, wherein J(M)/M≧0.12 is further satisfied.

3. The optical information recording medium as claimed in claim 1, wherein a lower dielectric protective layer, the recording layer, an upper dielectric protective layer and a reflective layer are successively stacked on the transparent substrate.

4. The optical information recording medium as claimed in claim 1, wherein the recording layer includes an AgInSbTe alloy as a main component, and when a composition of said alloy is represented by Ag$\alpha$In$\beta$Sb$\gamma$Te$\delta$ ($\alpha$, $\beta$, $\gamma$, $\delta$ denote atomic percentages, respectively), $\alpha$, $\beta$, $\gamma$ and $\delta$ fall within the following ranges:

$$0.1 \leq \alpha \leq 7.0,$$

$$2.0 \leq \beta \leq 10.0,$$

$$64.0 \leq \gamma \leq 92.0,$$

$$5.0 \leq \delta \leq 26.0, \text{ and}$$

$$\alpha+\beta+\gamma+\delta \geq 97.$$

5. The optical information recording medium as claimed in claim 1, wherein J(M)≦0.1.

6. The optical information recording medium as claimed in claim 1, wherein M≧0.55.

7. The optical information recording medium as claimed in claim 1, wherein each of the intervals of the grooves is no more than 1.2 μm.

* * * * *